United States Patent [19]
Itonori et al.

[11] Patent Number: 5,386,508
[45] Date of Patent: Jan. 31, 1995

[54] APPARATUS FOR GENERATING PROGRAMS FROM INPUTTED FLOWCHART IMAGES

[75] Inventors: Katsuhiko Itonori; Noboru Shimizu, both of Kanagawa, Japan

[73] Assignee: Fuji Xerox Co., Ltd., Tokyo, Japan

[21] Appl. No.: 745,897

[22] Filed: Aug. 16, 1991

[30] Foreign Application Priority Data

Aug. 24, 1990 [JP] Japan ................... 2-220976

[51] Int. Cl.⁶ .................. G06F 3/00; G06F 15/70; G06K 9/46
[52] U.S. Cl. .................. 395/161; 395/155; 382/9; 382/22; 382/1
[58] Field of Search .......... 395/161, 155, 159, 700, 395/147; 382/1, 9, 11, 21, 22, 24, 36

[56] References Cited

U.S. PATENT DOCUMENTS

| | | | |
|---|---|---|---|
| 3,805,237 | 4/1974 | Cobb et al. | 382/9 |
| 4,315,315 | 2/1982 | Kossiakoff | 395/700 X |
| 4,589,144 | 5/1986 | Namba | 382/9 X |
| 4,831,580 | 5/1989 | Yamada | 395/147 X |
| 4,833,721 | 5/1989 | Okutomi et al. | 382/21 |
| 5,048,096 | 9/1991 | Beato | 382/9 |
| 5,148,522 | 9/1992 | Okazaki | 395/161 |

OTHER PUBLICATIONS

A Software Development Method For Embedded System Based on Graphic Representation Technique, Institute of Electronics, Information and Communication Engineers, 1987 (Japanese Language Literature).

"A Classification of Kanji Characters for Use in Multi--font Printing" by Umeda, PRU78-13, 1987, pp. 1-8.

"A System for Recognizing Hand-written Logic Circuit Diagrams" Yamazaki and Ejima, PRU89-47, pp. 55-60, 1989.

*Primary Examiner*—Raymond J. Bayerl
*Attorney, Agent, or Firm*—Finnegan, Henderson, Farabow, Garrett & Dunner

[57] ABSTRACT

A program generator including: a character/figure separating device for separating characters and line graphics from an input flowchart image. A character recognizing device performs character recognition on the separated character portion and a figure recognizing device extracts symbols from the line graphics. A program code generating device generates instructions corresponding to the symbols and generates a program code by combining the generated instructions with the results of the character recognition that corresponds to the positions in which the symbols have been extracted. In the program generator, an image signifying the procedure of program processing which is composed of characters and line graphics, represented in a format easy for users to understand, is separated into an image in the character region and an image in the line graphics region and those images are subjected to individual recognition, with the results of recognition being combined to generate a coded program that is compatible with automatic machine processing. Hence, a desired computer program can be prepared by simple steps in a rapid and accurate way.

2 Claims, 6 Drawing Sheets

```
100 SUM=0
110 i=0
120 IF i>10 GOTO 160
130 SUM=SUM+1
140 i=i+1
150 GOTO 120
160 PRINT SUM
170 STOP
180 END
```

```
INT SUM, i;
SUM=0;
i=0;
WHILE (i<=10) {
    SUM+=i;
    i++;
}
PRINTF("%d", SUM);
RETURN;
```

START
SUM=0
i=0
i<=10      NO
       YES
SUM=SUM+i
i=i+1

SUM
END

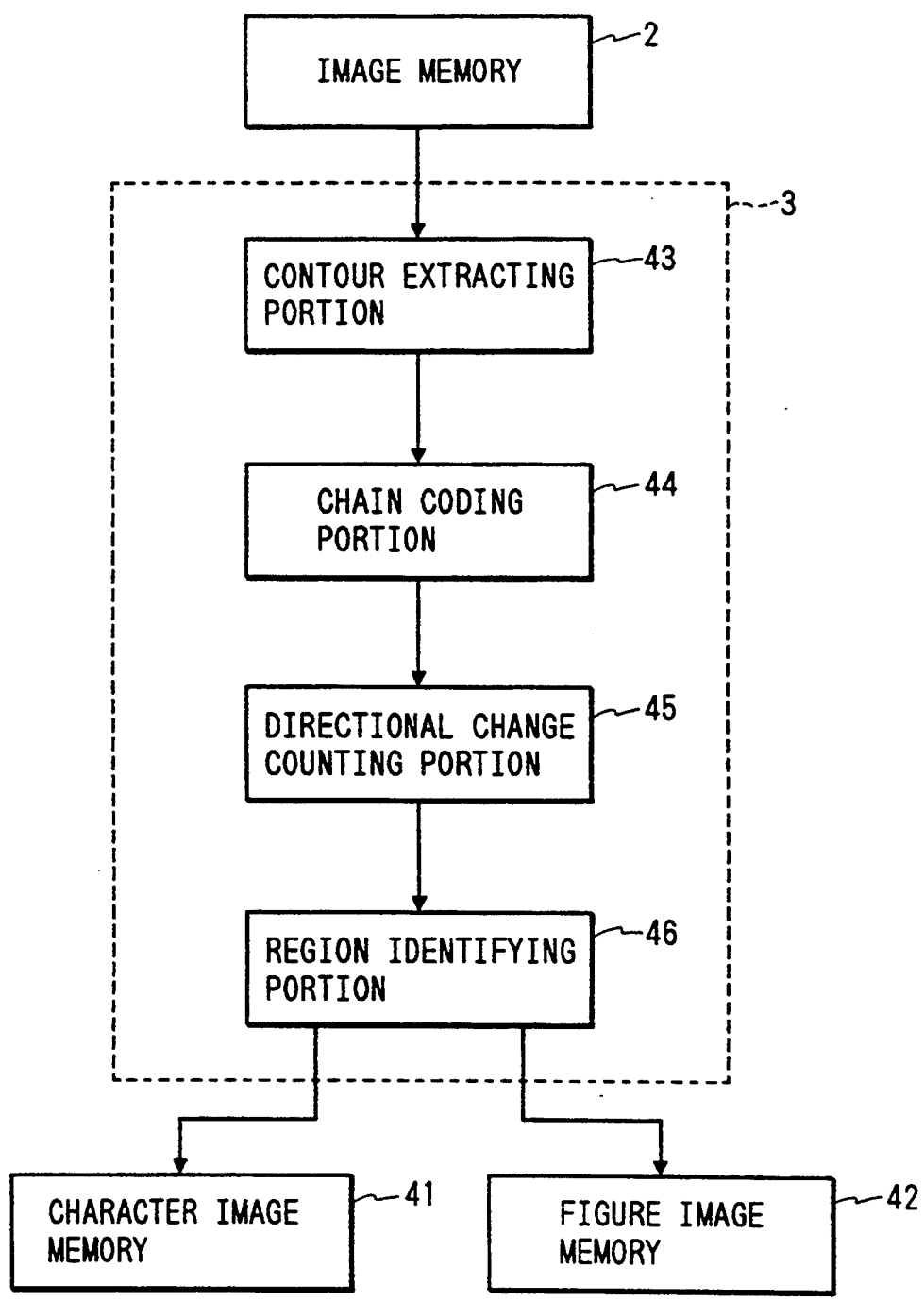

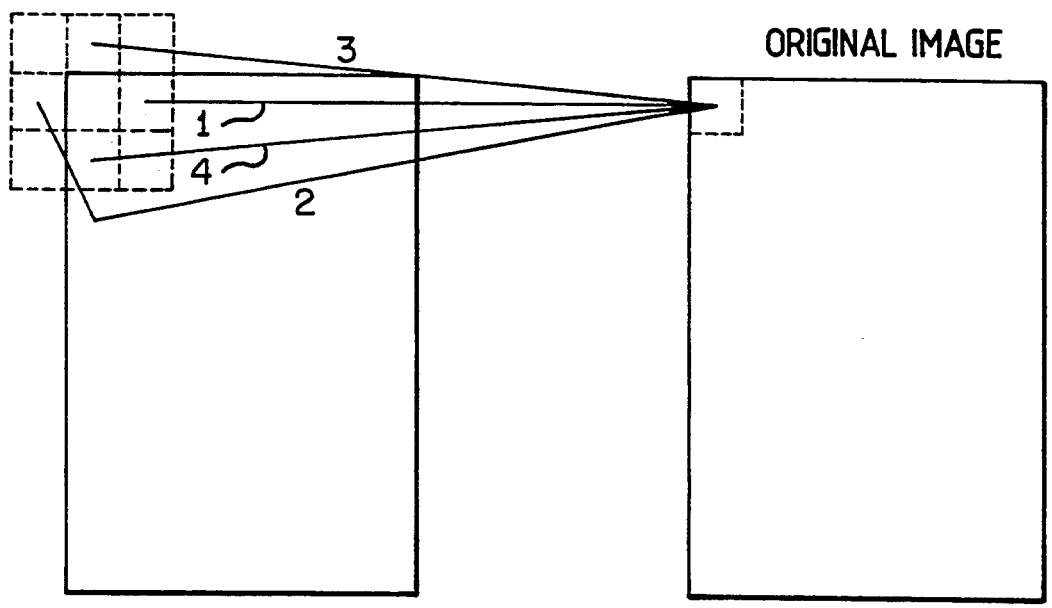
FIG. 5
FIG. 6a
FIG. 6b
FIG. 6c
FIG. 7
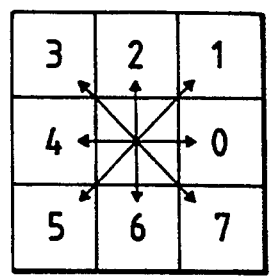

FIG. 9a
FIG. 9b
i<=10
NO
YES
FIG. 9c
WHILE(i<=10) {
}
WHILE( )
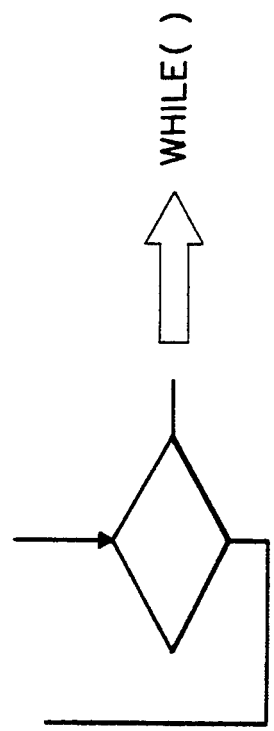
FIG. 8
| GRAPHIC SYMBOLS | CORRESPONDING INSTRUCTION |
|---|---|
| ⬭ | START OR END OF PROGRAM |
| ▭ | LINKING PROCESSES |
| ◇ | BRANCH STATEMENT |
| ⌐ | OUTPUT STATEMENT |

APPARATUS FOR GENERATING PROGRAMS FROM INPUTTED FLOWCHART IMAGES

BACKGROUND OF THE INVENTION

1. Field of the Invention

The present invention relates to a program generator which reads an image composed of characters and line graphics and transforms the contents of said image into coded information.

2. Description of Background

Apparatus by which a program written in a specified language can be generated from a flowchart is already sold on the market but all commercial products of such apparatus are intended to handle flowcharts that have been drawn on systems such as those having CAD capabilities. A technique associated with such apparatus was reported in "A Technique for Developing Built-in System Oriented Software by 1444 Graphic Representation" at the Commemorative National Conference celebrating the 70th anniversary of the founding of The Institute of Electronics, Information and Communication Engineers. With a view to realizing efficient software development, this technique utilizes the CAD capabilities of a computer in all stages ranging from software design to source code generation and combines the necessary parts to generate a flowchart which is then converted to a program.

However, in writing a new program, we rarely draw a flowchart on a trial-and-error basis using the program generator described above and, in almost all cases, we first draw a flowchart on paper that is half complete and then enter it into the program generator. In other words, the prior art method of program generation has the disadvantage that it involves two overlapping operations, one for drawing a flowchart on paper and the other for drawing the same flowchart on the apparatus. A further problem is that the operator has to learn interfaces (e.g. operating procedures) that are peculiar to the apparatus and this often increases the complexity of overall operations.

SUMMARY OF THE INVENTION

An object, therefore, of the present invention is to provide a program generator for generating a coded computer program from program representations that are easy to understand for humans as exemplified by flowcharts which are composed of the combination of line graphics and characters. The generator is capable of generating the intended computer program without letting the programmer be conscious of the machine interface and in a rapid and accurate manner.

In order to attain the above-stated object, the present invention provides a program generator which comprises the following components:

a character/figure separating device that separates characters and line graphic from an image in an input flowchart (as indicated by 3 in FIG. 1);

a character recognizing device that performs character recognition on said separated character portion (as indicated by 5 in FIG. 1);

a figure recognizing device that extracts a symbols from said line graphics (as indicated by 6 in FIG. 1); and a program code generating device that generates instructions corresponding to said symbols and which generates a program code by combining the generated instructions with the results of said character recognition that correspond to the positions in which said symbols have been extracted (as indicated by 7 in FIG. 1).

A graphic image such as a flowchart that is handwritten on paper or that is manually entered by graphic software is supplied into the character/figure separating device 3, where it is separated into a character region and a line graphics region. The image in the character region is subjected to character recognition by the character recognizing device 5, whereas the image in the line graphic region is sent to the figure recognizing device 6, where symbols are extracted.

In the program code generating device 7, instructions that correspond to the symbols extracted in the figure recognizing device 6 are generated and combined with the results of recognition by the character recognizing device 5 that correspond to the positions in which said symbols have been extracted, whereby a program code is generated.

According to the present invention, an image signifying the procedure of program processing that is composed of characters and line graphics and that is represented in a format easy to understand for humans is separated into an image in the character region and an image in the line graphics region and those images are subjected to individual recognition, with the results of recognition being combined to generate a coded program that is compatible with automatic machine processing. Hence, a desired computer program can be prepared by simple steps in a rapid and accurate way.

BRIEF DESCRIPTION OF THE DRAWINGS

FIG. 2a shows an example of the flowchart that contains characters and line graphics in admixture;

FIG. 2b is a sample program coded in C language as prepared by conversion from the flowchart of FIG. 2a;

FIG. 2c is a sample program coded in BASIC as prepared by conversion from the flowchart of FIG. 2a;

FIG. 4 is a block diagram showing the basic composition of character/figure separating unit;

FIG. 5 is a diagram illustrating the method of creating a shrunk image;

FIG. 6a shows an example of the original image;

FIG. 6b shows an example of the shrunk image obtained by the method shown in FIG. 5;

FIG. 6c shows an example of the contoured image;

FIG. 7 is a diagram showing the directions of chain codes in which chain coding is performed, as well as the numbers assigned to those directions;

FIG. 8 shows graphic symbols and the meanings of instructions that correspond to them; and FIGS. 9a-9c illustrate how a program is generated from a particular graphic symbol.

DESCRIPTION OF PREFERRED EMBODIMENT

Figure 1:
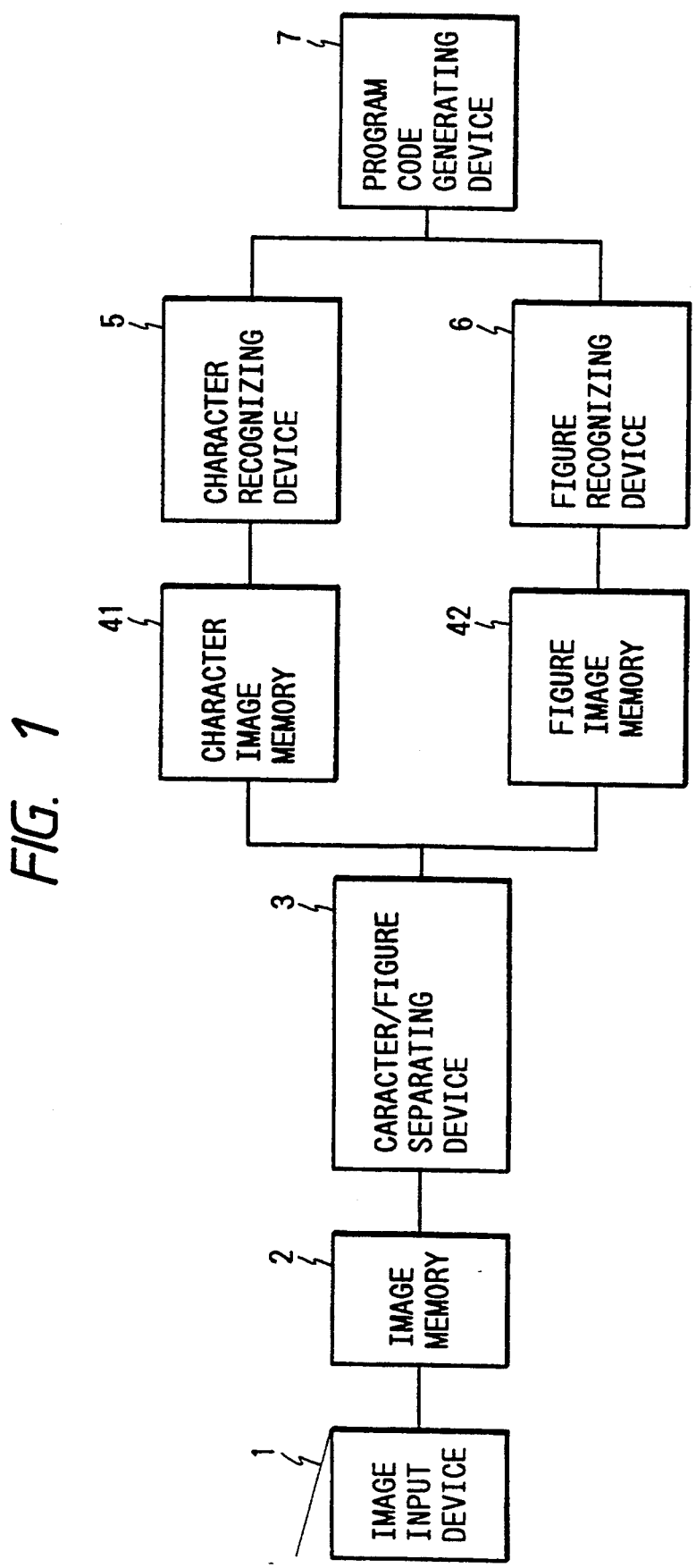
FIG. 1 is a block diagram showing the basic composition of a program generator according to an embodiment of the present invention.

FIG. 1 shows a program generator according to an embodiment of the present invention. The program generator comprises: an image input device 1; an image memory 2 for storing the original image; a character/figure separating unit for separating characters in the original image from line graphics; an image memory 41 for storing the image in the character region separated by the separating unit 3; an image memory 42 for storing the image in the graphic region separated by the separating unit 3; a character recognizing unit 5; a figure recognizing unit 6; and a program code generating unit 7 that combines the results of character recognition and figure recognition to generate a program code.

Figures 2A, 2B, 2C:
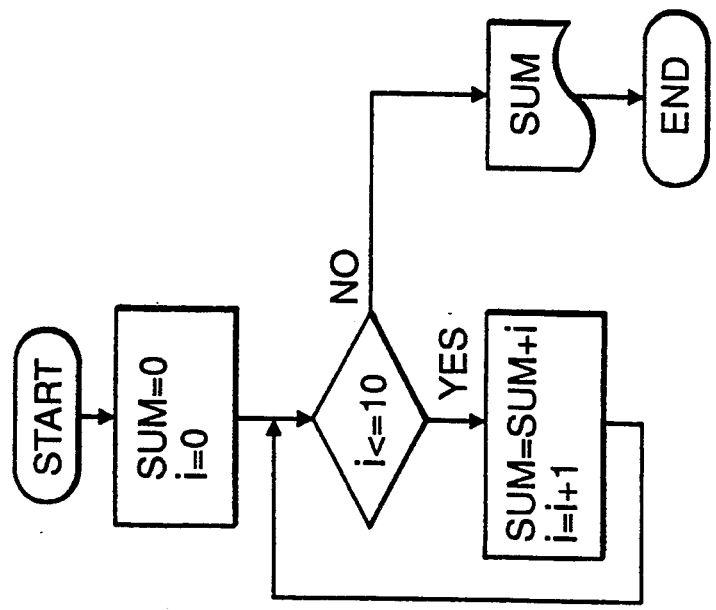

The image input device 1 is supplied with digital data of a flowchart that contains characters and line graphics, the entered flowchart is then stored in the image memory 2. FIG. 2a shows an example of flowcharts that can be entered into the image input device 1.

Figures 3A, 3B:
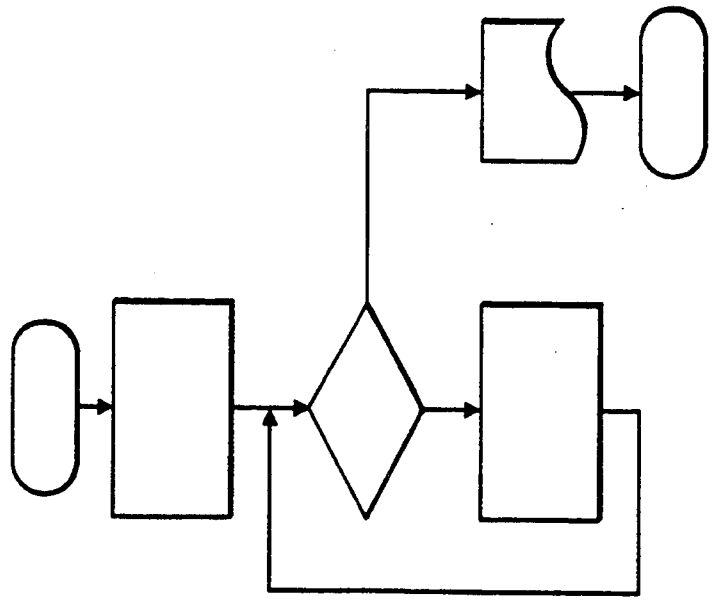
FIG. 3a shows an image in the character region that is obtained by the process of character/figure separation.
FIG. 3b shows an image in the line graphics region that is also obtained by the process of character/figure separation.

The image stored in the memory 2 is supplied into the character/figure separating unit 3, where it is separated into an image in the character region that is solely composed of characters (as shown in FIG. 3a) and an image in the graphics region that is solely composed of line graphics (as shown in FIG. 3b). The respective images are stored in the memories 41 and 42.

Art example of the character/figure separating unit 3 is described below. FIG. 4 shows an example of the basic composition for the character/figure separating unit. As shown, it comprises an image memory 2, a contour extracting portion 43, a chain coding portion 44, a directional change counting portion 45, a region identifying portion 46, a memory 41 of the image in the character region, and a memory 42 of the image in the graphics region.

The image memory 42 stores the digital data of flowchart that has been entered into the image input device 1 and it is the same as shown in FIG. 1.

The contour extracting portion 43 performs the following contouring operation as shown in FIG. 5, the original image is ANDed with an image obtained by shifting it to the right by one pixel; the resulting image is ANDed (logical product) with an image obtained by shifting the original image to the left by one pixel; similar AND operations are performed with respect to images that are obtained by shifting the original image both upward and downward by one pixel; as a result, an image is created that has shrunk in four directions by one pixel; this image is XORed (exclusive logical sum) with the original image to extract its contour. FIG. 6 depicts the original image, the shrunk image and the contoured image.

The chain coding portion 44 raster scans the contoured image to find any black pixel in it. If a black pixel is located, it is replaced by a white pixel and the eight areas adjacent said pixel are scanned. If any black pixel is found, chain coding is performed as shown in FIG. 7 and that pixel is replaced by a white one. This process is repeated until there is not black pixel in the surrounding eight area. If more than one black pixel is present in those areas, position information on black pixels other than the pixel of interest is stacked. Upon completion of the tracing of the main black pixel, the stacked pixel portion information is retrieved and subjected to chain code in the same manner. The chain code extracted by tracing on the basis of the stacked pixel information is continuous to the main chain code and may be designated as "a child chain code". When all of the pixel information in stack has been retrieved, the initial raster scan is resumed. This process completes the chain coding of all areas of the image of interest.

The directional change counting portion 45 counts the number of changes in the direction of strings of chain coded black pixels (each string being a set of one main chain code and a plurality of continuous child chain codes).

A generally established criterion for distinguishing a character from a (geometric) figure states that "a character is comparatively small in size, is complex in shape and has many directional changes in the contour whereas a figure is comparatively large in size, is simple in shape and has a smaller number of directional changes in the contour" in the light of this criterion, the region identifying portion 46 identifies an image region of interest as a character region if the number of changes in the direction of each chain code is larger than a given threshold value, and identifies it as a graphics region if said number is smaller than the threshold.

The region identified as a character region is transferred into the image memory 41 for storing characters and region identified as a graphics region transferred to the image memory 42 for storing figures. The image stored in the character image memory 41 is forwarded to the character recognizing unit 5 and the image stored in the figure image memory 42 to the figure recognizing unit 6.

In the character recognizing unit 5, the character in the image memory 41 is recognized and an associated character code is produced as an output; at the same time, the position in which the character is located is produced as an output in terms of coordinates in the image in the character region. Such character recognizing unit has been available in many types and the intended character recognition can be realized by using a suitable type (see, for example, "A Classification of Kanji Characters for Use in Multi-font Printing" by Umeda, PRU78-13, 1987).

In the figure recognizing unit 6, graphic symbols in the image memory 42 are recognized and instructions corresponding to the results of that recognition are produced as an output. The graphic symbols that are recognized and the meanings of instructions that correspond to those symbols are shown in FIG. 8. The figure recognizing unit 6 may be composed of any device that is capable of recognizing line graphics. For example, the graphic symbols to be recognized are preliminarily registered in a dictionary and figures in an image of interest are pattern-matched with the dictionary to perform graphics recognition (see, for example, "A System for Recognizing Hand-written Logic Circuit Diagrams" by Yamazaki and Ejima, PRU89-47, p. 55-60).

Another means of recognizing figures involves extracting line segments from an image of interest and recognizing the figure on the basis of the combination of the extracted in segments. For example, a figure composed of line segments that intersect one another at right angles is a rectangle and recognized as a figure that signifies a sequence of processing operations in a flowchart.

In the program code generating unit 7, a program is generated on the basis of a combination of the results of recognition by the character recognizing unit 5 and recognition by the figure recognizing unit 6. Stated more specifically, the program code generating unit 7 references the image in the memory 42 and identifies the order in which individual graphic symbols are linked. First, the unit 7 searches for a graphic symbol signifying the start of a program on the basis of the results of character and figure recognition and the order of linkage is designated "1". In the case shown in FIG. 2, the graphic symbol "START" signifies the start of a program. Then, the unit 7 follows the line segment extending from that symbol, finds a symbol signifying the next step of program generation, and designates the order of linkage as "2". The unit 7 continues this process until a graphic symbol signifying the end of the program appears, whereby the order of linkage between successive graphic symbols is determined. If, in this process, a line segment extending from a branch statement returns to the line segment that was once passed, a graphic symbol signifying this branch statement will be dealt with as one that signifies repetition.

In the next step, the program code generating unit 7 generates a program from the individual graphic symbols in accordance with the order in which they are linked. On the pages that follow, the process of generating a program from the graphic symbol signifying the branch statement in FIG. 2 is described.

On the basis of the recognition of graphic symbols and the process described above, the graphic symbol shown in FIG. 9a is found to signify a repeat statement. Accordingly, "while" is first generated. Then, the unit 7 examines the results of character recognition that are located around said graphic symbol (see FIG. 9b) and searches for the condition of the repeat statement. In the case of the example, the result of character recognition "Y" (see FIG. 9b) is in the neighborhood of the line segment extending from the graphic symbol (see FIG. 9a) to signify repetition, so the condition of the repeat statement may well be taken as "i<=10" which is another result of character recognition, whereby a program can be generated as shown in FIG. 9c. If the line segment in the neighborhood of "n" which is still another result of character recognition signifies repetition, the result of character recognition "i<=10" is modified and the condition of the repeat statement is changed to "i>10".

By following these procedures a program can be generated from a flowchart that is written on paper and that is composed of characters and line graphics.

In the embodiment described above, a computer program is assumed to be generated from a flowchart but it can be generated from PAD and other formats of representation by changing the referents of graphic symbols.

As described on the foregoing, according to the present invention, an image signifying the procedure of program processing that is composed of characters and line graphics and that is represented in a format easy to understand for humans is separated into an image in the character region and an image in the line graphics region and those images are subjected to individual recognition, with the results of recognition being combined to generate a code program that is compatible with automatic machine processing. Hence, a desired computer program can be prepared by simple steps in a rapid and accurate way.

What is claimed is:

1. A program generator comprising:
   character figure separating means for separating characters and line graphics from an input image of a flowchart into a separated character portion and a separated line graphic portion comprising:
   image memory means for storing said input image;
   contour extracting means for performing a contouring operation to obtain a contoured image from said input image stored in said image memory means;
   chain coding means for performing a chain coding operation to trace black pixels in a region of said input image stored in said image memory means;
   directional change counting means for counting a number of changes in direction of strings of chain coded black pixels within said region; and
   region identifying means identifying said region as the separated character portion if said number of changes in the direction is larger than a predetermined threshold value, and identifying the region as the separated line graphic portion if said number is smaller than said predetermined threshold value;
   character recognizing means for performing character recognition on said separated character portion;
   figure recognizing means for extracting symbols from said separated line graphic portion; and
   program code generating means for generating instructions corresponding to said symbols and for generating a program code by combining the generated instructions with the results from said character recognizing means corresponding to the positions from which said line graphics were extracted.

2. A program generator comprising:
   image input means;
   input image memory for storing an input image of a flowchart from said image input means;
   character image memory for storing a separated character portion;
   figure image memory for storing a line graphic portion;
   character figure separating means for separating characters and line graphics from said input image of a flowchart into said separated character portion and said separated line graphic portion comprising:
   contour extracting means for performing a contouring operation to obtain a contoured image from said input image stored in said input image memory;
   chain coding means for performing a chain coding operation to trace black pixels in a region of said input image stored in said input image memory;
   directional change counting means for counting a number of changes in direction of strings of chain coded black pixels within said region; and
   region identifying means identifying said region as the separated character portion if said number of changes in the direction is larger than a predetermined threshold value, and identifying the region as the separated line graphic portion if said number is smaller than said predetermined threshold value;
   character recognizing means for performing character recognition on said separated character portion;
   figure recognizing means for extracting symbols from said separated line graphic portion; and
   program code generating means for generating instructions corresponding to said symbols and for generating a program code by combining the generated instructions with the results from said character recognizing means corresponding to the positions from which said line graphics were extracted.

* * * * *